United States Patent

[11] 3,617,340

| [72] | Inventor | Lawrence E. Thielen<br>Villa Park, Ill. |
|---|---|---|
| [21] | Appl. No. | 769,753 |
| [22] | Filed | Oct. 22, 1968 |
| [45] | Patented | Nov. 2, 1971 |
| [73] | Assignee | R. R. Donnelley & Sons Company |

[54] METHOD AND COMPOSITION FOR COPPERIZING ALUMINUM OFFSET PLATES COATED WITH AN EXPOSED AND DEVELOPED WATER-SOLUBLE RESIST
4 Claims, No Drawings

[52] U.S. Cl........................................ 117/38,
96/33, 101/459, 106/1, 117/130
[51] Int. Cl........................................ C23c 3/00

[50] Field of Search.............................. 117/212,
130 E, 160; 106/1; 260/606.5 P, 438.1; 161/191;
96/33; 101/459

[56] References Cited
UNITED STATES PATENTS

| 2,676,886 | 4/1954 | Barbarite...................... | 106/1 X |
|---|---|---|---|
| 3,431,120 | 3/1969 | Weisenberger............... | 106/1 |
| 3,438,805 | 4/1969 | Potrafke....................... | 106/1 X |

*Primary Examiner*—Ralph S. Kendall
*Attorney*—Hofgren, Wegner, Allen, Stellman & McCord

ABSTRACT: A copperizing solution for aluminum surfaces comprising a water miscible organic solvent for cuprous chloride which will not dissolve gum arabic; a cuprous salt such as the chloride; hydrochloric acid; an aminoborane; and a trialkylphosphine.

METHOD AND COMPOSITION FOR COPPERIZING ALUMINUM OFFSET PLATES COATED WITH AN EXPOSED AND DEVELOPED WATER-SOLUBLE RESIST

This invention relates to a method and a composition for copperizing aluminum offset plates coated with an exposed and developed water-soluble resist such as gum arabic rendered photosensitive with a soluble bichromate and differentially soluble (as between exposed and unexposed areas) in an aqueous calcium chloride solution.

Various aminoboranes have been used in aqueous nickel and cobalt salt solutions to deposit nickel and cobalt boron alloys on various substrata. These boranes have also been used as reducing agents in aqueous cupric salt solutions also containing a copper complexing agent, for depositing a copper film on metallic or nonmetallic surfaces. Such aqueous solutions cannot be used on the above-mentioned resist coated aluminum plates, since these solutions would dissolve the resist.

Copperizing methods and solutions are known that include a water miscible organic solvent for cuprous chloride which will not dissolve gum arabic. Such solvents are usually alcohols or alcohol-ethers of low or no water content, for instance, absolute ethyl alcohol, isopropyl alcohol, ethylene glycol monoethyl ether, ethylene glycol monobutyl ether, and the like. To increase the solubility of cuprous chloride in such solvents a small amount of hydrochloric acid is usually added thereto. The resultant three component copperizing solutions (which contain solvent, cuprous chloride and hydrochloric acid) do form a copper film on an aluminum surface, but this copper film is neither consistently adhesive (to the underlying aluminum) nor mechanically strong.

The copperizing solutions of the present invention include an organic solvent of the nature disclosed in the preceding paragraph; a cuprous salt such as cuprous chloride or sulfate; hydrochloric acid; an aminoborane such as trimethylamineborane, triethlyamineborane, dimethylamineborane, t-butylamineborane, di-isopropylamineborane, butidineborane or pyridineborane; and a trialkylphosphine such as tributylphosphine or trioctylphosphine.

For best results (rapid plating), the above disclosed solution should be as concentrated as possible. The hydrochloric acid is added to increase the solubility of the cuprous salt. It is added as concentrated (37 percent) hydrochloric acid, to minimize the amount of water in the solution. Suitably, the amount of hydrochloric acid ranges from 2 to 5 percent (by weight) of the organic solvent. At this acidity, the amount of cuprous salt dissolved in the organic solvent ranges from 2 to 5 percent (by weight, as cuprous chloride) of the organic solvent. Best results are obtained with equal percentages of hydrochloric acid and cuprous chloride, preferably 4 to 5 percent. More than 5 percent hydrochloric acid reduces the adhesion of the copper film.

Only enough aminoborane is used to decolorize the above disclosed solution, i.e. to insure that all the dissolved copper salt is present in cuprous form. This usually amounts to about 1 percent (by weight) of the cuprous salt present taken as cuprous chloride, the aminoborane being taken as dimethylamineborane. If another aminoborane is substituted, a stoichiometrically equivalent amount is used.

The alkylphosphine is used in an amount ranging from 2 to 5 percent (by weight) of the cuprous salt, taken as cuprous chloride, the alkylphosphine being taken as tributylphosphine. About 4 percent is preferred. If another trialkylphosphine is substituted, a stoichiometrically equivalent amount is used.

Thus, the solution of the present invention includes an organic solvent of the nature disclosed; from 2 to 5 percent (by weight) of the solvent of a cuprous salt (taken as cuprous chloride) and also of concentrated hydrochloric acid; an amount of an aminoborane sufficient to decolorize the solution; and a trialkylphosphine in an amount ranging from 2 to 5 percent (by weight) of the cuprous salt taken as cuprous chloride, the alkylphosphine being taken as tributylphosphine. The solution should not contain more than 5 percent water, or it will dissolve the resist on the plates.

This solution may be stored indefinitely under a nitrogen atmosphere in a closed container.

The solution of this invention is prepared under a nitrogen atmosphere. The organic solvent is purged with nitrogen before being used. This is done to prevent oxidation of the cuprous chloride, and to reduce the amount of aminoborane needed. The latter compound serves to reduce the cupric copper present to cuprous copper. It is added ahead of the alkylphosphine, which serves as a protective agent. If the phosphine is omitted, any solution left in a container which has been opened is not stable, while a solution containing the phosphine remains colorless and may be used some time after the container has been opened and a part of the solution has been used.

The above solution is applied to a developed, exposed aluminum offset plate by flooding the plate with the solution and working the solution with an applicator such as a napkin for 5 or 6 minutes. One-half gallon of solution will coat a 40-inch × 60-inch plate with a copper film 50 to 100 microns thick. This film is distinguished by exceptional resistance to abrasion, adherence to the underlying aluminum and ability to attract and hold printing ink.

For effecting very best adhesion under any and all humidity conditions (at the time the film is deposited), copperizing is preceded by an iron chloride etching step carried out in conventional fashion. The etching solution will typically include 16 oz. ferric chloride solution of a specific gravity of 1.500, 1¼ oz. 37 percent hydrochloric acid and enough calcium chloride solution of specific gravity of 1.400 to make a total volume of 1 gallon. The solution is applied by padding for about 2 minutes after which the plate is rinsed with a solvent of the same general nature as that used in making up the copperizing solution as in the final rinse disclosed below. It should be noted, in this connection, that all prior art copperizing solutions with which I am familiar will at uncontrollable and unpredictable times yield poorly adherent copper films, especially when the films are deposited under high humidity conditions, regardless of whether or not the plate has been etched with a ferric chloride solution.

A specific example of a solution according to the present invention consists of 1 gallon (3,540 grams) of ethylene glycol monoethyl ether; 119cc. (142 grams) of 37 percent hydrochloric acid; 142 grams of cuprous chloride; 0.9 grams of dimethylaminoborane; and 6 grams of tributylphosphine. It is applied as disclosed in the preceding paragraph, with excellent results.

After the copper film has been formed on the offset plate, the plate must be given a final rinse or wash to remove residual copper salt and to dry the plate before a lacquer is applied to the copper film to make this film permanently ink receptive. This washing step is carried out with an organic solvent of the above disclosed nature used for making up my copperizing solutions. In other words, the solvent may not dissolve or attack the residual gum arabic resist, must be a solvent for cuprous chloride, and at the same time must be capable of leaving the copper film clean and dry. For this reason, the rinse should not contain more than 2 percent water. If any gum arabic were transferred to the copper film, the ink receptivity of the film would be reduced.

Many details may be varied without departing from this invention as set out in the accompanying claims.

I claim:

1. A copperizing solution for aluminum offset plates coated with an exposed and developed water-soluble resist, said solution comprising an organic solvent for cuprous chloride which will not dissolve gum arabic; from 2 to 5 percent (by weight) of said solvent of a cuprous salt (taken as cuprous chloride); from 2 to 5 percent (by weight) of said solvent of concentrated hydrochloric acid; an amount of an amino borane only sufficient to decolorize said solution; and trialkylphosphine in an amount ranging from 2 to 5 percent (by weight) of said cuprous salt taken as cuprous chloride, said alkylphosphine being taken as tributylphosphine; said solution having a water content not in excess of 5 percent (by weight).

2. A solution according to claim 1 in which said cuprous salt is cuprous chloride, said amino borane is dimethylamine borane, and said alkylphosphine is tributylphosphine.

3. A method of copperizing an aluminum offset plate coated with an exposed and developed water-soluble resist, said method comprising contacting said plate with a solution according to claim 1 and thereafter rinsing said plate with an organic solvent for cuprous chloride which will not dissolve gum arabic.

4. A method of copperizing an aluminum offset plate coated with an exposed and developed water soluble resist, said method comprising contacting said plate with a solution according to claim 2 and thereafter rinsing said plate with an organic solvent for cuprous chloride which will not dissolve gum arabic.

* * * * *